United States Patent [19]

Van Pijkeren

[11] Patent Number: 5,051,658

[45] Date of Patent: Sep. 24, 1991

[54] ELECTRIC HIGH-PRESSURE DISCHARGE LAMP FOR USE AS A MOTOR VEHICLE HEADLAMP

[75] Inventor: Dirk Van Pijkeren, Corning, N.Y.

[73] Assignee: U.S. Philips Corporation, New York, N.Y.

[21] Appl. No.: 591,575

[22] Filed: Oct. 2, 1990

[30] Foreign Application Priority Data

Nov. 21, 1989 [NL] Netherlands ........................ 8902866

[51] Int. Cl.[5] ............................................ B60Q 1/04

[52] U.S. Cl. ........................................ 315/82; 315/58; 315/151

[58] Field of Search ............................ 315/82, 58, 151; 313/318, 51; 362/221, 265

[56] References Cited

U.S. PATENT DOCUMENTS

| | | | |
|---|---|---|---|
| 3,422,310 | 1/1969 | Widmayer | 315/291 |
| 3,483,428 | 12/1969 | Plante | 315/151 |
| 3,681,654 | 8/1972 | Quinn | 315/151 |
| 3,821,593 | 6/1976 | Roselli | 315/82 |
| 4,249,160 | 2/1981 | Chilvers | 315/82 X |
| 4,645,975 | 2/1987 | Meitzler et al. | 315/82 |
| 4,713,583 | 12/1987 | Hochstein | 315/82 |
| 4,862,037 | 8/1989 | Farber et al. | 315/82 X |
| 4,868,456 | 9/1989 | Sanders et al. | 313/623 |
| 4,874,989 | 10/1989 | Nilssen | 315/151 |
| 4,968,895 | 11/1990 | Leclercg | 315/82 X |

*Primary Examiner*—Eugene R. LaRoche
*Assistant Examiner*—Do Hyum Yoo
*Attorney, Agent, or Firm*—Brian J. Wieghaus

[57] ABSTRACT

The lamp has a holder body in which an end portion of the discharge vessel is secured. A light-receiving window of a photoelectrical element is positioned inside the holder body and aimed at a sealed end portion of the discharge vessel. The photoelectrical element may be connected to the control of the electric supply of the lamp in order to obtain a high luminous flux within a short period after ignition of the lamp. External factors have little influence on the control action thanks to the position of the window.

2 Claims, 1 Drawing Sheet

ELECTRIC HIGH-PRESSURE DISCHARGE LAMP FOR USE AS A MOTOR VEHICLE HEADLAMP

BACKGROUND OF THE INVENTION

The invention relates to an electric high-pressure discharge lamp for use as a motor vehicle headlamp, comprising a discharge vessel having an axis and provided with a discharge space between a first and a second end portion, which end portions comprise respective seals adjoining said discharge space, in which a pair of electrodes and a gas filling are present, current supply conductors of the pair of electrodes extending to the exterior through respective seals.

a holder body of insulating material in which the first end portion of the discharge vessel is indetachably secured, which holder body is provided with electrical contacts which are connected to respective current supply conductors.

Such a lamp is known from EP 030941-A, which corresponds to U.S. Pat. No. 4,868,456.

A disadvantage of the use of a discharge lamp as a motor vehicle headlamp is that without special measures such a lamp does not yield sufficient light instantaneously upon switching on of a supply source. If within a very short period after ignition of the lamp a considerable fraction of the luminous flux is to be obtained, which is achieved in the stable operating condition of the lamp, the lamp may be operated at an extra high current before that stable condition is achieved.

The time required for obtaining the considerable fraction of the luminous flux, however, depends on, for example, the temperature of the lamp during ignition. If the lamp is operated at an extra high current for the same period under all circunstances, this period may sometimes be too short, sometimes too long. If the period is too short, the considerable fraction of the luminous flux is not obtained quickly enough. If the period is too long, the result is an overshoot. This is disadvantageous because the excessive luminous flux of the lamp may cause glare and because the useful flie of the lamp or its supply unit may be shortened.

U.S. Pat. No. 3,681,654 discloses how a pipe is aimed at a low pressure discharge lamp, between its electrodes, guiding the received light to a photosensitive transistor of a control circuit in order to control the luminous flux of the lamp.

U.S. Pat. No. 3,483,428 discloses a photosensitive variable-impedance element, such as a photosensitive resistor, which is aimed at a discharge lamp in order to control the power consumed by this lamp.

DE 15 63 971 C3 discloses how a photoelectrical or heat-sensitive device is applied against a low-pressure discharge lamp laterally of the discharge path, which device is connected to a control circuit.

The known means are not suitable for controlling the power consumed by a lamp of the type described in the opening paragraph. A heat-sensitive device is not eligible since it is of essential importance for controlling lamp power whether the lamp has a certain temperature as a result of a recently extinguished discharge or as a result of a recently ignited discharge.

A lamp designed for use in an optical system comprising a reflector and a lens in order to form a profiled light beam, possibly containing sharp light/dark cut-offs, as in a passing beam, has a very small discharge arc with a length of a few mm, for example 5 mm or less, and a diameter of approximately 1 mm. A light sensor positioned against the discharge vessel would cut off a too large solid angle and severely affect the light beam formed.

Furthermore, a motor vehicle headlamp is used in surroundings comprising other light sources, for example headlamps of other motor vehicles coming from the opposite direction, which can shine into the headlamp concerned. A sensor mounted in the reflector of a motor vehicle headlamp can thus react to light coming from outside the headlamp and control the supply of the discharge lamp incorrectly as a result. If the discharge lamp is mounted interchangeably in a motor vehicle headlamp, pollution of a sensor mounted in the reflector is possible, so that again an incorrect signal is given. Moreover, such a headlamp has the disadvantage that, if the discharge lamp is replaced with a discharge lamp of a different make, the lamp and the sensor may be badly attuned to one another.

SUMMARY OF THE INVENTION

The invention has for its object to provide an electric high pressure discharge lamp of the type described in the opening paragraph which is of a simple construction and which renders controls of the power consumed by the lamp possible.

According to the invention, this object is achieved in that a light-receiving window of a photoelectric element is positioned inside the holder body and aimed at the first end portion of the discharge vessel.

The light-receiving window may be the input end of an optical waveguide, an optical fibre or bunch of optical fibres, which may be coupled at its output end to a photoelectrical element, such as, for example, a photodiode or a photosensitive resistor, or the light input of an actual photoelectrical element.

It is necessary for the application in a motor vehicle headlamp that the discharge arc of the discharge lamp is straight. This entails the necessity of a narrow discharge vessel having a thick wall, for example, as disclosed in U.S. Pat. No. 4,594,529. Since the discharge arc of the aforesaid small dimensions must give sufficient light for enabling a comparatively small reflector to yield a sufficiently strong beam, the discharge arc has a very high luminance, which is e.g. up to three times as high as that of a halogen lamp for the same application. The first end portion thus conducts a relatively large luminous flux. This luminous flux renders it possible to position the light-receiving window in the axial direction of the lamp vessel at a distance from the discharge arc, outside the beam of light directly radiated by the discharge or reflected by a reflector cooperating with the lamp.

The light-receiving window is indetachably connected to the discharge lamp, so that, if the lamp with its holder is mounted interchangeably in a motor vehicle head lamp, compatibility is safeguarded in the case of lamp exchange. Alternatively, however, the lamp with the holder may be connected indetachably to a reflector, forming a seal-beam headlamp. The positioning of the window in the very low sensitivity to ambient light.

In one embodiment, the light-receiving window is mounted against the first end portion of the discharge vessel. There is a direct coupling then, and external factors have a minimal influence.

BRIEF DESCRIPTION OF THE DRAWINGS

Embodiments of the high-pressure discharge lamp according to the invention are shown in the drawing, in which.

DETAILED DESCRIPTION OF THE PREFERRED EMBODIMENTS

Figure 1:
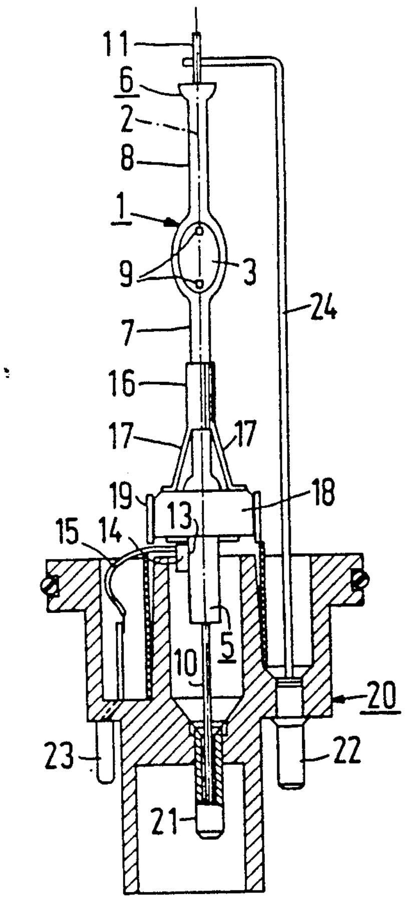
FIG. 1 shows a first embodiment, partly in side elevation, partly in cross-section.

In FIG. 1, the electric high pressure discharge lamp designed for use as a motor vehicle headlamp defines a lamp discharge vessel 1, for example made of quartz glass, which vessel has an axis 2. A discharge space 3 is situated between a first 5 and second end portion 6, which have seals 7, 8, respectively, adjoining the discharge space 3. Inside the discharge space there is a pair of electrodes 9 and a gas filling, for example xenon, or xenon and mercury, or xenon and metal halide, or xenon, mecury and metal halide. Current supply conductors 10, 11 extend from the pair of electrodes 9 through the respective seals 7, 8, to the exterior.

A holder body 30 made of insulating material, in which the first end portion is indetachably secured, is provided with electrical contacts 21, 22, which are connected to current supply conductors 10, 11, respectively.

The seal 7 has a metal sleeve 16 secured to it, which sleeve has tongues 17 fastened to a bush 18. The bush 18 is welded in such a position in a tube 19 connected to the holder body 20 that the pair of electrodes 9 assume a pre-determined position relative to the holder body 20. A conductor 24 is welded both to the contact 22 and to the current supply conductor 11, thus interconnecting them.

A light-receiving window 13 of a photoelectrical element 14 is positioned inside the holder body 20 and aimed at the first end portion 5 of the discharge vessel 1. In the Figure, the light-receiving window 13, the light input of the photoelectrical element 14, a photodiode, is mounted against that end portion. The photodiode 14 is connected to contacts 23 by means of conductors 15 to connect it to a control circuit for the lamp supply.

The lamp shown is made for use as a motor vehicle headlamp which can be exchangeably inserted in a reflector which has a lens.

Figure 2:
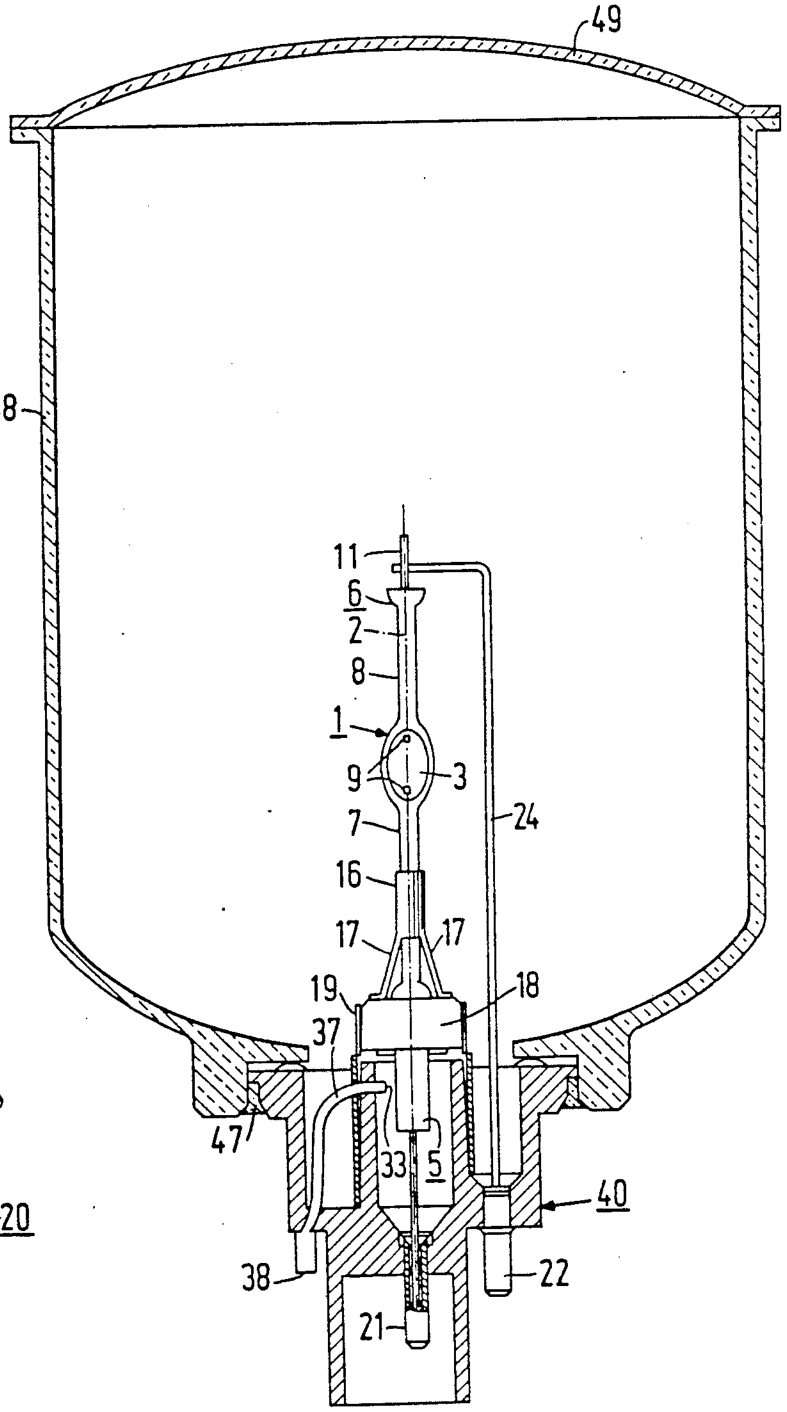
FIG. 2 shows a second embodiment in a similar manner.

In FIG. 2, parts corresponding to parts in FIG. 1 have the same reference numerals.

The holder body 40 of the lamp shown is indetachably connected to a reflector 48, which is provided with a lens 49, by means of a sealing compound 47, for example, a glass enamel.

The light-receiving window 33 of a photoelectrical element is positioned inside the holder body 40 and aimed at the first end portion 5 of the lamp. The light-receiving window 33 is the input end of an optical conductor 37 which has an output end 38 for being coupled to a photoelectrical element.

I claim:

1. An electric high-pressure discharge lamp for use as a motor vehicle headlamp, comprising a discharge vessel defining a lamp axis and enclosing a discharge space between, said discharge vessel having first and second portion end portions each comprising a respective seal adjoining said discharge space, a pair of electrodes and a gas filling in said discharge space, and current supply conductors of the pair of electrodes extending from each electrode through a respective seal to the exterior of said discharge vessel, a holder body of insulating material in which said first end portion of said discharge vessel is indetachably secured, said holder body having electrical contacts connected to respective said current supply conductors, characterized in that:

a light-receiving window of a photoelectric element is positioned inside said holder body and aimed at said first end portion of said discharge vessel.

2. An electric discharge lamp as claimed in claim 1, characterized in that said light receiving window is mounted in contact with said first end portion of said discharge vessel.

* * * * *